E. HINDERS & J. REINTSMA.
BELT SHIFTER.
APPLICATION FILED JULY 19, 1907.
913,890.
Patented Mar. 2, 1909.
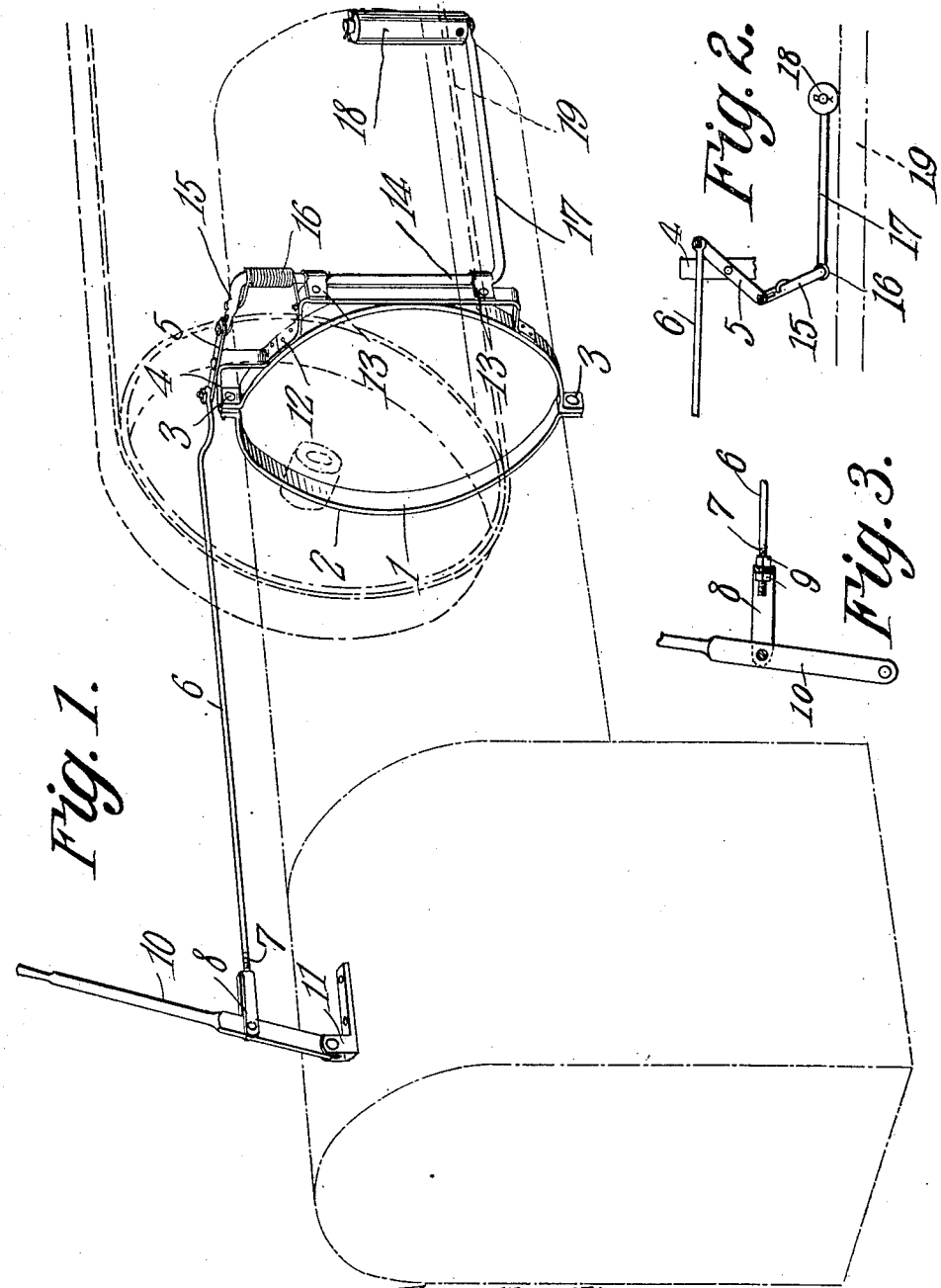
WITNESSES:
Engelke Hinders
John Reintsma
INVENTORS
By C. A. Snow & Co.
ATTORNEYS
THE NORRIS PETERS CO., WASHINGTON, D. C.

UNITED STATES PATENT OFFICE.

ENGELKE HINDERS AND JOHN REINTSMA, OF SIBLEY, IOWA.

BELT-SHIFTER.

No. 913,890.  Specification of Letters Patent.  Patented March 2, 1909.

Application filed July 19, 1907. Serial No. 384,656.

*To all whom it may concern:*

Be it known that we, ENGELKE HINDERS and JOHN REINTSMA, citizens of the United States, residing at Sibley, in the county of Osceola and State of Iowa, have invented a new and useful Belt-Shifter, of which the following is a specification.

This invention has relation to belt shifters and it consists in the novel construction and arrangement of its parts as hereinafter shown and described.

The object of the invention is to provide a belt shifter especially adapted to be used upon a traction or similar engine which is used for threshing purposes and the parts of the shifter are so arranged that the belt may be shifted at any time while the engine is in operation by the manipulation of a lever located at or near the platform of the engine. In removing the belt from the pulley wheel it is not necessary to touch the belt with the hands as the parts of the shifter effect complete removal of the belt from the wheel.

In the accompanying drawing:—Figure 1 is a perspective view of the shifter showing an engine boiler belt and wheel in phantom. Fig. 2 is a top plan view showing the manner of connecting a rocker to a lever used in the shifter and, Fig. 3 is a detail view partly in section showing the manner of connecting a rod to an operating lever of the shifter.

The shifter is mounted on the band 1 which surrounds the boiler of the engine. Said band is made up of the members 2, 2 which are bolted together at their ends as at 3. A strip 4 is attached to one of the members 2 at the upper end thereof and forms a shoulder. The rocker or lever 5 is pivoted on said shoulder and the rod 6 is pivoted at one end to one of the ends of the said rocker. The opposite end of the said rod 6 is screw-threaded as at 7 and passes through a perforation in the link 8. The nuts 9 engage the threads 7 and bear against opposite sides of the end of the link 8 and form means for adjusting the rod 6 longitudinally with relation to the said link. The link 8 is pivoted to the lever 10 which is fulcrumed to the lug 11 which is adapted to be attached to the body of the engine. The strip 12 is also attached to the member 2 which supports the shoulder 4. The said strip 12 stands away from the member 2 to which it is attached and is provided with the bearings 13, 13 which are spaced apart.

The rod 14 is journaled in the bearings 13 and its crank end 15 is pivotally attached by means of a pin and slot connection to that end of the rocker or lever 5 opposite the end to which the rod 6 is attached. The coil spring 16 surrounds the upper portion of the rod 14 and one end of the said spring has engagement with the crank end 15 of the shaft and the other end of the said spring is fixed to the strip 12. The spring 16 is under tension, tending to hold the crank end 15 of the rod 14 extending toward the rear of the engine, as in Fig. 2. The lower portion of the rod 14 is formed into a crank end 17 at the extremity of which is journaled a roller 18 said roller extending parallel with the rod 14. The roller 18 normally lies adjacent the edge of the belt 19 and when the lever 10 is drawn back the rocker or lever 5 is turned on its pivot through the instrumentality of the rod 6 and through the crank end 15, the rod 14 is turned axially and the crank end 17, together with the roller 18 is moved toward the belt 19. When the roller 18 engages the edge of the belt it pushes the same laterally off of the pulley wheel of the engine, thus, the belt is shifted.

While the device is described as being particularly adapted to be used upon engines for threshing it may also be used to advantage on engines employed in doing other kinds of work.

Having described our invention what we claim as new and desire to secure by Letters-Patent is:—

A belt shifter comprising a support made up of members bolted together, a part having a shoulder mounted upon one member, a strip mounted upon the same member and having bearings, a shaft journaled in said bearings, and having crank ends, one of which is provided with a belt engaging roller, a spring engaging the support and the shaft, a rocker pivoted upon the shoulder and being pivotally connected with the other crank of the shaft, and a lever mechanism operatively connected with the said rocker.

In testimony that we claim the foregoing as our own, we have hereto affixed our signatures in the presence of two witnesses.

ENGELKE HINDERS.
JOHN REINTSMA.

Witnesses:
C. V. YOUNG,
E. C. UPP.